Figure 1:
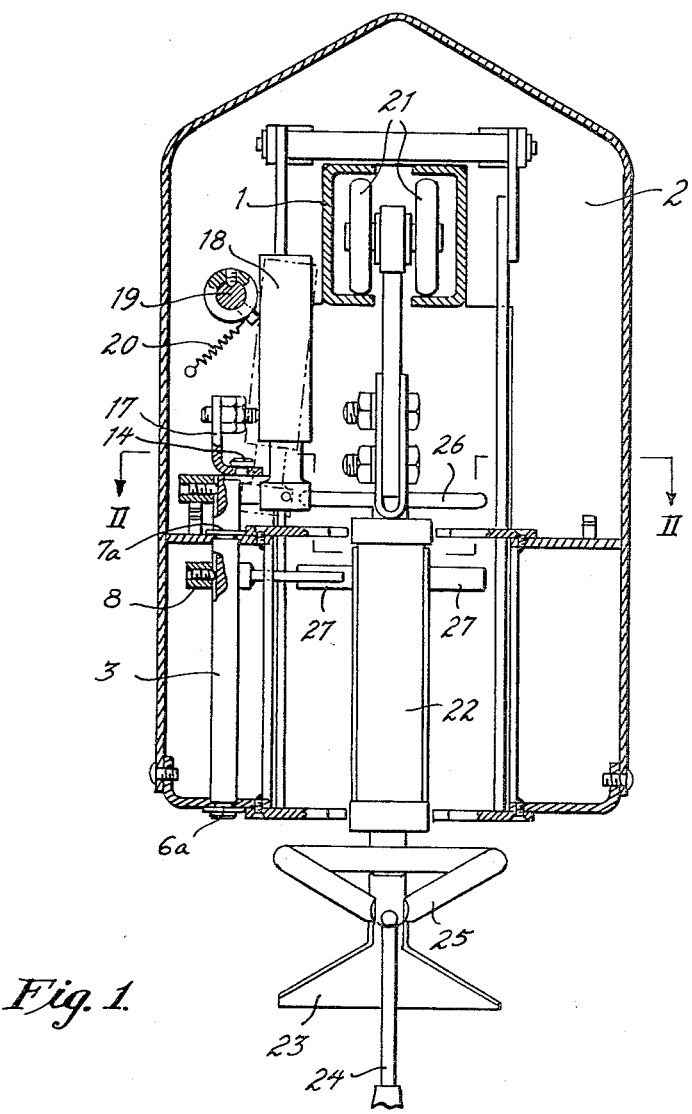

March 28, 1967  HANS-GEORG FROMME ET AL  3,311,244
UNLOADING STATION FOR CONVEYOR Filed Sept. 22, 1965  2 Sheets-Sheet 2

INVENTORS.
HANS-GEORG FROMME
FRIEDRICH STILLGER

Gerard J. Weiser

United States Patent Office 3,311,244
Patented Mar. 28, 1967

3,311,244
UNLOADING STATION FOR CONVEYOR
Hans-Georg Fromme and Friedrich Stillger, Wetzlar, Germany, assignors to Fromme Forderanlagen G.m.b.H., Wetzlar, Germany, a corporation of Germany
Filed Sept. 22, 1965, Ser. No. 489,360
Claims priority, application Germany, Sept. 29, 1964, F 26,748
9 Claims. (Cl. 214—60)

The invention relates to endless conveyors which transport the goods to be conveyed on individual elements or carriers. Along the conveyor are positioned stations at which the goods transported by the conveyor carriers are to be unloaded. The unloading of a particular conveyor carrier at a particular station takes place in response to appropriate destination indicators mounted on the carrier. In known forms of such arrangements the destination is indicated by adjusting to a particular height a projecting arm attached to the carrier. At the desired station this projecting arm then encounters an oppositely projecting arm set at the same height. When that happens, the goods being conveyed are unloaded.

To permit conveyor elements or carriers of small size to be adaptable for unloading at any of a large number of stations, it has been proposed to adjust, by means of two control handles, two such projecting arms, positioned one behind the other in the direction of travel of the carrier. At the station, the unloading mechanism is then intended to operate only when both these arms encounter correspondingly positioned oppositely projecting arms.

It is an object of the present invention to provide an arrangement in which unloading is prevented when only one projection encounters an opposing projection.

This and other objects which will appear are accomplished in accordance with the present invention by providing, at each station along the conveyor, two of the above-mentioned oppositely projecting arms bearing on a rocker arm. This rocker arm acts essentially as a compound lever displaceable transversely to the direction of conveyor travel. Moreover, this rocker arm forms part of the stationary portion of the actuating mechanism for apparatus which is mounted on the carrier itself and which serves to unload the goods being conveyed by the carrier. The actuator for the unloading apparatus is preferably pendulously suspended from the station and is spring-loaded so as to bear against the said lever ahead of the latter's pivot point. To facilitate adjustment of the oppositely projecting arms to the same heights as the projecting arms attached to the carrier, the former are mounted, in vertically adjustable manner, on shafts placed perpendicularly to the rocker arm at opposite ends of the latter. The shafts themselves are connected to the rocker arm via crank-like mechanisms subject to spring pressure.

For further details reference may be had to the description which follows and to the accompanying drawings wherein—

Figure 2:
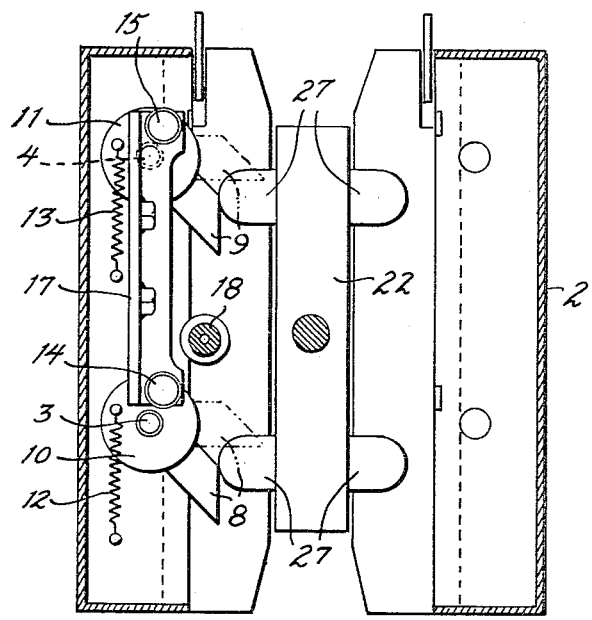

FIGURE 1 shows generally in cross-section an elevation of a station embodying the invention as well as the spatial relationships between it and a carrier moving along the conveyor; and FIGURE 2 shows a top view of a section taken generally along II—II in FIGURE 1.

The same reference numerals designate corresponding parts of the two figures.

As shown in the drawings, to which reference may now be had, a station housing 2 is located at a destination point on the endless conveyor represented by track 1. On housing 2 there are mounted two shafts 3 and 4, respectively rotatable within bearings 6a, 6b and 7a, 7b. Mounted on shafts 3 and 4, respectively, are projecting arms 8 and 9 which are adjustable in height and adapted to be held in fixed positions relative to shafts 3 and 4. In addition, there are attached to shafts 3 and 4, discs 10 and 11, respectively. These discs, which are spring-loaded by springs 12 and 13, serve to guide rocker arm 17 along an eccentric or crank-like path pivoting about pins 14 and 15. Actuating member 18 rests against rocker arm 17. Member 18 pivots about shaft 19 and is spring-loaded by spring 20. The conveyor carrier 22 travels along track 1 supported by rollers 21. At its lower end, the carrier transports the material to be conveyed, suspended from a hook 24 resting on the blunt, and slightly concave apex of wedge 23. Positioned above the wedge there is a wiper arm 25 attached to a shaft which extends vertically through the carrier and whose upper end bears the two arms 26. In addition, both sides of carrier 22 are provided with projecting arms 27 which are adjustable in height.

Each station along the conveyor is designated by a particular number or letter denoting the height at which arms 8 and 9 are set. The arms 27 extending from a particular carrier 22 can then be set to the same height as the arms projecting from the desired destination station. As the carrier 22 then arrives at the station at which the material which its transports, together with the hook 24 from which that material is suspended, is to be unloaded, one of the arms 27 attached to the carrier presses against its opposite arm 8, while the other arm 27 presses against its opposite arm 9. In FIGURE 2 arms 8 and 9 are shown in broken lines in the positions which they occupy when not subject to pressure from arms 27 and in solid lines in the positions to which they are deflected by such pressure. Only when both arms 8 and 9 are thus displaced by pressure from the two arms 27, is rocker arm 17 pushed forward far enough, transversely to the direction of conveyor travel, that actuating member 18 is brought into engagement with the adjacent arm 26. In FIGURE 1, the engagement position of member 18 is shown in solid lines, and its disengaged position in broken lines. When engagement does occur, further travel of arm 26 causes the latter to rotate to the extent that wiper arm 25, to which arm 26 is rigidly connected, pushes conveyor carrier hook 24 from its rest on wedge 23.

It will be understood that other forms of the invention will readily occur to those skilled in the art without departing from the inventive concept. Accordingly, we desire the scope of that concept to be limited only by the appended claims.

We claim:
1. For use with a conveyor having a traveling carrier with a pair of arms projecting on a side thereof and an unloading station for said carrier, the apparatus comprising:
   a station housing for said carrier wherein said carrier is unloaded,
   a pair of vertically disposed rotatable shafts supported within said housing at said side of said carrier by means attached to said housing,
   a pair of projecting arms mounted on said shafts, said arms projecting horizontally from said shafts toward said side of said carrier and means to hold said arms in fixed positions relative to said shafts and to permit pivotal displacement about different pivot points, said arms being long enough to engage the arms on said carrier,
   a lever-like arm extending between said projecting arms on said shafts, means for moving said lever-like arm transversely toward said carrier upon rotation of said shafts by said pair of projecting arms on said shafts, and
   means linking the opposite ends of said lever-like arm to different ones of said projecting arms on said shafts for eccentric movement about their pivot points, displacement of at least one projecting arm causing transverse displacement of said lever-like arm.

2. The apparatus of claim 1 further comprising a pendulous member bearing against said lever-like arm near the pivot point thereof.

3. The apparatus of claim 1 further comprising resilient means usrging said member into engagement with said lever-like arm,.

4. The apparatus of claim 1 characterized in that said projecting arms are adjustable as to their vertical postions.

5. The apparatus of claim 4 further comprising resilient means urging both ends of said lever-like arm away from the path of travel of said carrier.

6. The apparatus of claim 5 further characterized in that said projecting arms are responsive to engagement by the arms on the carrier passing the station to displace said lever-like arm toward said path of travel.

7. The apparatus of claim 6 further characterized in that said displacement of said lever-like arm toward said path of travel also displaces the lower end of said pendulous member toward said path of travel.

8. The apparatus of claim 7 further characterized in that said displacement of said member brings a portion thereof into the path of travel of a projection from said carrier, said carrier comprising means responsive to engagement of said last-named projection with said portion to unload the carrier.

9. The apparatus of claim 8 further characterized in that said portion is at a different vertical position than said projecting arms and said lever-like arm.

References Cited by the Examiner
UNITED STATES PATENTS

| | | | |
|---|---|---|---|
| 2,342,598 | 2/1944 | Ozouf | 198—19 |
| 3,146,874 | 9/1964 | McGow | 104—88 |

EVON C. BLUNK, *Primary Examiner.*

RICHARD E. AEGERTER, *Assistant Examiner.*